US008342960B2

(12) United States Patent
Tominaga et al.

(10) Patent No.: US 8,342,960 B2
(45) Date of Patent: Jan. 1, 2013

(54) INFORMATION PROCESSOR

(75) Inventors: Takehiro Tominaga, Tokyo (JP); Masaki Higuchi, Tokyo (JP); Keisuke Shimizu, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 21 days.

(21) Appl. No.: 11/946,104

(22) Filed: Nov. 28, 2007

(65) Prior Publication Data

US 2008/0182668 A1   Jul. 31, 2008

(30) Foreign Application Priority Data

Jan. 26, 2007   (JP) ................................. 2007-017169

(51) Int. Cl.
*A63F 13/10* (2006.01)
*A63F 13/12* (2006.01)
(52) U.S. Cl. .......................................... 463/29; 463/43
(58) Field of Classification Search .............. 436/40–43; 463/29

See application file for complete search history.

(56) References Cited

U.S. PATENT DOCUMENTS

| | | | | |
|---|---|---|---|---|
| 4,858,930 A * | 8/1989 | Sato | ................................. | 463/23 |
| 5,337,357 A * | 8/1994 | Chou et al. | ........................ | 705/56 |
| 5,355,302 A * | 10/1994 | Martin et al. | ................. | 700/234 |
| 5,528,490 A * | 6/1996 | Hill | ................................ | 717/168 |
| 5,563,946 A * | 10/1996 | Cooper et al. | ................... | 705/56 |
| 5,598,470 A * | 1/1997 | Cooper et al. | ................ | 713/165 |
| 5,643,086 A * | 7/1997 | Alcorn et al. | ................... | 463/29 |
| 5,689,560 A * | 11/1997 | Cooper et al. | ................... | 705/52 |
| 5,708,709 A * | 1/1998 | Rose | ............................... | 705/59 |
| 5,771,347 A * | 6/1998 | Grantz et al. | .................... | 726/31 |
| 5,883,954 A * | 3/1999 | Ronning | ........................ | 705/52 |
| 5,883,955 A * | 3/1999 | Ronning | ........................ | 705/52 |
| 6,075,937 A * | 6/2000 | Scalzi et al. | .................... | 703/23 |
| 6,132,315 A * | 10/2000 | Miyamoto et al. | ............... | 463/43 |
| 6,334,214 B1 * | 12/2001 | Horstmann | .................... | 717/170 |
| 6,857,067 B2 * | 2/2005 | Edelman | ........................ | 713/155 |
| 6,884,171 B2 * | 4/2005 | Eck et al. | ........................ | 463/42 |
| 7,465,231 B2 * | 12/2008 | Lewin et al. | .................... | 463/37 |
| 2001/0010046 A1 * | 7/2001 | Muyres et al. | ................... | 705/52 |
| 2001/0031665 A1 * | 10/2001 | Taho et al. | ....................... | 463/43 |

(Continued)

FOREIGN PATENT DOCUMENTS

JP   11-102388   4/1999

(Continued)

OTHER PUBLICATIONS

"Architecture for a Video Arcade Game Network," IBM Technical Disclosure Bulletin, Apr. 1, 1991, vol. 33, issue 11, pp. 138-141, NN9104138.*

(Continued)

*Primary Examiner* — David L Lewis
*Assistant Examiner* — Matthew D. Hoel
(74) *Attorney, Agent, or Firm* — Katten Muchin Rosenman LLP

(57) ABSTRACT

A related ID information retaining unit relates and stores IDs of game titles related to each other. A game data storage unit stores saved data with a title ID. A title ID acquisition unit acquires a title ID of a game program to be executed, and a related title acquisition unit then acquires another game title ID related to the acquired title ID in a related ID information database. A game data identification unit identifies game data stored in the game data storage unit, based on the title ID acquired by the related title acquisition unit.

6 Claims, 9 Drawing Sheets

U.S. PATENT DOCUMENTS

| | | | |
|---|---|---|---|
| 2002/0045484 A1* | 4/2002 | Eck et al. | 463/42 |
| 2002/0116615 A1* | 8/2002 | Nguyen et al. | 713/168 |
| 2003/0181242 A1* | 9/2003 | Lee et al. | 463/42 |
| 2004/0043819 A1* | 3/2004 | Willis | 463/42 |
| 2004/0053691 A1* | 3/2004 | Kawase | 463/33 |
| 2004/0157664 A1* | 8/2004 | Link | 463/43 |
| 2006/0046819 A1* | 3/2006 | Nguyen et al. | 463/16 |
| 2006/0160626 A1* | 7/2006 | Gatto et al. | 463/43 |

FOREIGN PATENT DOCUMENTS

JP 2001-340655 1/2001

OTHER PUBLICATIONS

Machine translation of JP 11-102388 A, application JP 09-260665, downloaded from http://dossier1.ipdl.inpit.go.jp, Jan. 13, 2010.*

Machine translation of JP 2001-340665 A, application JP 2000-125832, downloaded from http://dossier1.ipdl.inpit.go.jp, Jan. 13, 2010.*

Game manual for "Super Mario Land" for the Nintendo Game Boy, downloaded from www.replacementdocs.com, Aug. 27, 2010.*

Game manual for "Super Mario Land 2" for the Nintendo Game Boy, downloaded from www.replacementdocs.com, Aug. 27, 2010.*

IGN.com review for "Super Mario Land" for Game Boy, downloaded from http://gameboy.ign.com/objects/008/008816.html, Aug. 27, 2010.*

IGN.com review for "Super Mario Land 2" for Game Boy, downloaded from http://gameboy.ign.com/objects/005/005982.html, Aug. 27, 2010.*

Notification of Reason(s) for Refusal, dated Mar. 3, 2009, for corresponding Japanese Application 2007-017169.

Shining Force III Scenario 1, Ohto-no-kyoshin, Perfect Navigation, Feb. 2, 1998, p. 132, First Edition, Ascii Corporation, Japan.

Shining Force III Scenario 1, Ohto-no-kyoshin, Official Guide, Dec. 30, 1997, p. 24, Sega Enterprise Corporation, Japan.

Weekly Fami-tsu, Nov. 13, 1998, p. 35, vol. 13, No. 46, No. 517, Ascii Corporation, Japan.

Notification of Reason(s) for Refusal dated Sep. 24, 2008, from the corresponding Japanese Application.

Decision to Dismiss the Amendment dated Jul. 14, 2009, from the corresponding Japanese Application.

Inheritance from scenarios 1 and 2—synchronicity system—, Shining Force III Scenario 3, Hyouheki-no-Jashingu, Official Guide, Sega Enterprise Corporation, Sep. 30, 1998, First Edition, p. 36, Published by Softbank Corporation.

Questioning dated Aug. 24, 2010, from the corresponding Japanese Application.

Microsoft Project 2000, Complete Guidance, Softbank Publishing Corporation, Dec. 21, 2001, 1st Edition, pp. 98-113.

* cited by examiner

FIG.4A

| SERIES NAME | VERSION INFORMATION | | | | |
|---|---|---|---|---|---|
| | Ver.1 | Ver.2 | Ver.3 | Ver.4 | ...... |
| ⋮ | ⋮ | ⋮ | ⋮ | ⋮ | ...... |
| ABC CAR RACE | ABC-1 | ABC-2 | ABC-3 | — | ...... |
| ⋮ | ⋮ | ⋮ | ⋮ | ⋮ | ...... |

| TITLE ID | RELATED GAME TITLE ID |
|---|---|
| ⋮ | ⋮ |
| ABC-1 | — |
| ABC-2 | ABC-3, ABC-1 |
| ABC-3 | ABC-2, ABC-1 |
| ⋮ | ⋮ |

154

INFORMATION PROCESSOR

BACKGROUND OF THE INVENTION

1. Field of the Invention

The present invention relates to an information processing technique, particularly to a technique for processing content data such as a game program.

2. Description of the Related Art

In recent years, a technique called emulation has been attracting attention, in which software developed for given target hardware is operated by another hardware, which is different from the target hardware. With the emulation technique, hardware resources to be provided in target hardware, such as a CPU (Central Processing Unit), a memory and a disk system, are virtually built by an emulator program. When an application program to be run on target hardware accesses such hardware resource, an emulator program for providing the hardware resource to be accessed performs inputting or outputting of data as if actual hardware responded, thus enabling the application program to run.

A conventional game device typically writes the progress of a game or the like in an external storage medium such as a memory card. Among game software products, there is one called "series software", and some popular series software products are upgraded and re-sold every few years. There are many series software products provided with a function by which data saved in former game software can be also used in new game software, so as to increase users' incentive to move to new software.

An emulation apparatus used for a game generally differs from a conventional game device in hardware structure and does not normally comprise a slot for installing an external storage medium such as a memory card, which is used in a conventional game device. Meanwhile, since the technological advances of recent years have enabled remarkable increase in the capacity of storage media, emulation apparatuses are now configured to be able to install high-capacity storage media, which are different in specification from storage media used for conventional game devices. Accordingly, saved data in a memory card is loaded into such high-capacity external storage medium or internal storage medium in an emulation apparatus, and subsequently a virtual memory card is created therein.

In this way, many virtual memory cards can be created in a single storage medium for an emulation apparatus. This has undoubtedly provided convenience to users because they formerly needed multiple memory cards to save various data. On the other hand, since many virtual memory cards can be created in a single storage medium, users may bear a burden of finding, from among such virtual memory cards, the one storing desired saved data. Besides emulation apparatuses, when multiple kinds of content data are stored in one or multiple storage media, it is normally troublesome for users to find desired content data in the storage media.

SUMMARY OF THE INVENTION

Accordingly, a general purpose of the present invention is to provide an information processing technique by which content data including saved data can be efficiently identified so as to improve users' convenience.

To solve the problem above, one embodiment of the present invention relates to an information processor. The information processor comprises: a related identification information retaining unit which relates and stores pieces of identification information of contents related to each other; a content data storage unit which stores content data; a process data identification information acquisition unit which acquires identification information of content data to be processed; a related data acquisition unit which acquires, from the related identification information retaining unit, identification information of other content data related to identification information acquired by the process data identification information acquisition unit; and an identification unit which identifies other content data related, based on identification information acquired by the related data acquisition unit. With such information processor, content data related to content data to be processed can be identified efficiently.

Another embodiment of the present invention also relates to an information processor. The information processor comprises: an identification unit which identifies other content data related to content data to be processed; and a notification unit which provides information on identified content data. With such information processor, a user can be notified of information on content data related to content data to be processed.

Optional combinations of the aforementioned constituting elements, and implementations of the invention in the form of methods, apparatuses, systems, recording mediums and computer programs may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 4A is a diagram that shows an example of a related ID information database, and FIG. 4B is a diagram that shows an example of a related ID information table;

DETAILED DESCRIPTION OF THE INVENTION

The invention will now be described by reference to the preferred embodiments. This does not intend to limit the scope of the present invention, but to exemplify the invention.

Figure 1:
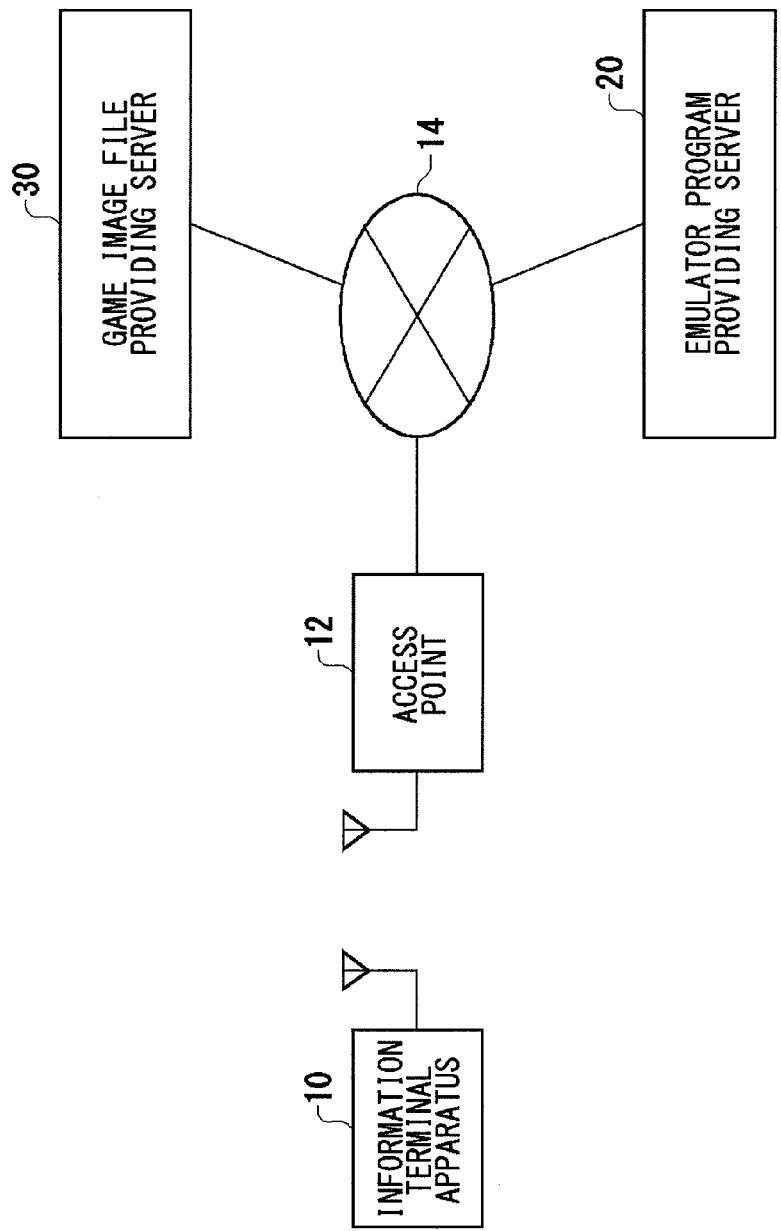
FIG. 1 is a diagram that shows a configuration of a communication system according to an embodiment.

FIG. 1 shows a configuration of a communication system 1 according to an embodiment. The communication system 1 comprises an information terminal apparatus 10, an access point 12 connected to the information terminal apparatus 10 via a wireless LAN (Local Area Network), and an emulator program providing server 20 and a game image file providing server 30 which are connected to the access point 12 via a network 14. The emulator program providing server 20 provides an emulator program for a game to the information terminal apparatus 10. The game image file providing server 30 provides an image file of a game program to the information terminal apparatus 10. An image file is data in a single file that contains the whole content and structure of a storage medium storing a game program, and a typical example thereof is an "ISO image"—a CD image file in ISO 9660 format. A file created from a ROM storing a game program is sometimes called a "ROM image".

The information terminal apparatus 10 is a processor configured to have a wireless communication function, which in the embodiment is a communication function using a wireless LAN. The information terminal apparatus 10 may have a communication function using another wireless communication system, or may have a communication function in which the apparatus is connected to an external apparatus via a wired cable such as a USB cable.

The access point 12 functions as a relay apparatus, which connects the information terminal apparatuses 10 via a wireless LAN, connects the information terminal apparatus 10 to another access point via a wireless LAN, or connects the information terminal apparatus 10 to the network 14, which may be the Internet or a wired LAN. The information terminal apparatus 10 in the communication system 1 can be connected to the emulator program providing server 20 and the game image file providing server 30 via the access point 12. When the information terminal apparatus 10 has a wired communication function, a PC (personal computer) or a game console connected to the network 14, for example, may be used as a relay apparatus via which the information terminal apparatus 10 connects to the emulator program providing server 20 and game image file providing server 30.

The information terminal apparatus 10 may be a portable game device. When a disk containing a game program is installed in a disk reader, the information terminal apparatus 10 can retrieve and execute the game program. Also, the information terminal apparatus 10 of the present embodiment may be other than a portable game device, and it may be another terminal apparatus such as a stationary game device, a personal computer, a cellular phone or a PDA (Personal Digital Assistance). Whichever terminal apparatus is used as the information terminal apparatus 10, the apparatus functions as an emulation apparatus capable of executing a game program provided by the game image file providing server 30, by activating an emulator program provided by the emulator program providing server 20.

The emulator program providing server 20 provides an emulator program for executing, on the information terminal apparatus 10, a game program for a certain game device. An emulator program may constitute a part of firmware, and the emulator program providing server 20 in the communication system 1 may be configured as a firmware update server that provides updated firmware, accordingly. In such case, when a user instructs the information terminal apparatus 10 to update firmware, the information terminal apparatus 10 downloads updated firmware from the emulator program providing server 20. The information terminal apparatus 10 can acquire an emulator program by downloading firmware, thereby functioning as an emulation apparatus.

The game image file providing server 30 creates an image file of a game program for a certain game device and provides the image file to the information terminal apparatus 10. For example, the game image file providing server 30 transmits to the information terminal apparatus 10 a list of game titles that can be downloaded. When a user selects a desired game title, the information terminal apparatus 10 downloads the image file thereof into a storage medium such as a flash memory.

Then, the information terminal apparatus 10 activates an emulator program and reads the downloaded image file, thereby advancing a game as if it were the certain game device.

With a conventional game device, an external storage medium, such as a memory card, having a capacity of about 1 megabyte is typically used to store saved data of a game. Now that the storage capacity of a memory card does not suffice, another storage medium, such as a flash memory having a high capacity, is used instead. Accordingly, the information terminal apparatus 10 is not normally provided with a slot for a memory card used in a conventional game device. Meanwhile, game programs are created on the premise that the data is read out from and written into memory cards, based on hardware structure of conventional game devices. Therefore, in order to run a game program on the information terminal apparatus 10, a virtually-provided memory card (hereinafter also referred to as a "virtual memory card") needs to be created on a storage medium. A virtual memory card is a "disk image" configured to have the same capacity as a conventional memory card, and the information terminal apparatus 10 stores saved data or the like in the disk image.

There are many game software products provided as a series. In game software in a series, the game program is created so that saved data of former game software can be used in new game software. There is also a case where saved data of new game software can be used in former game software. Accordingly, it is preferable that the reception or transfer of saved data is performed easily on the information terminal apparatus 10 functioning as an emulator, without troubling users excessively. As an example, series game software "ABC car race" will be described in the following. In this series, game titles "ABC car race 1", "ABC car race 2" and "ABC car race 3" are available, in which the number in the title indicates version information and a larger number means a newer version. In the present specification, a game title means information that identifies game software, so that a game title corresponds one to one with each game software.

Figure 2:
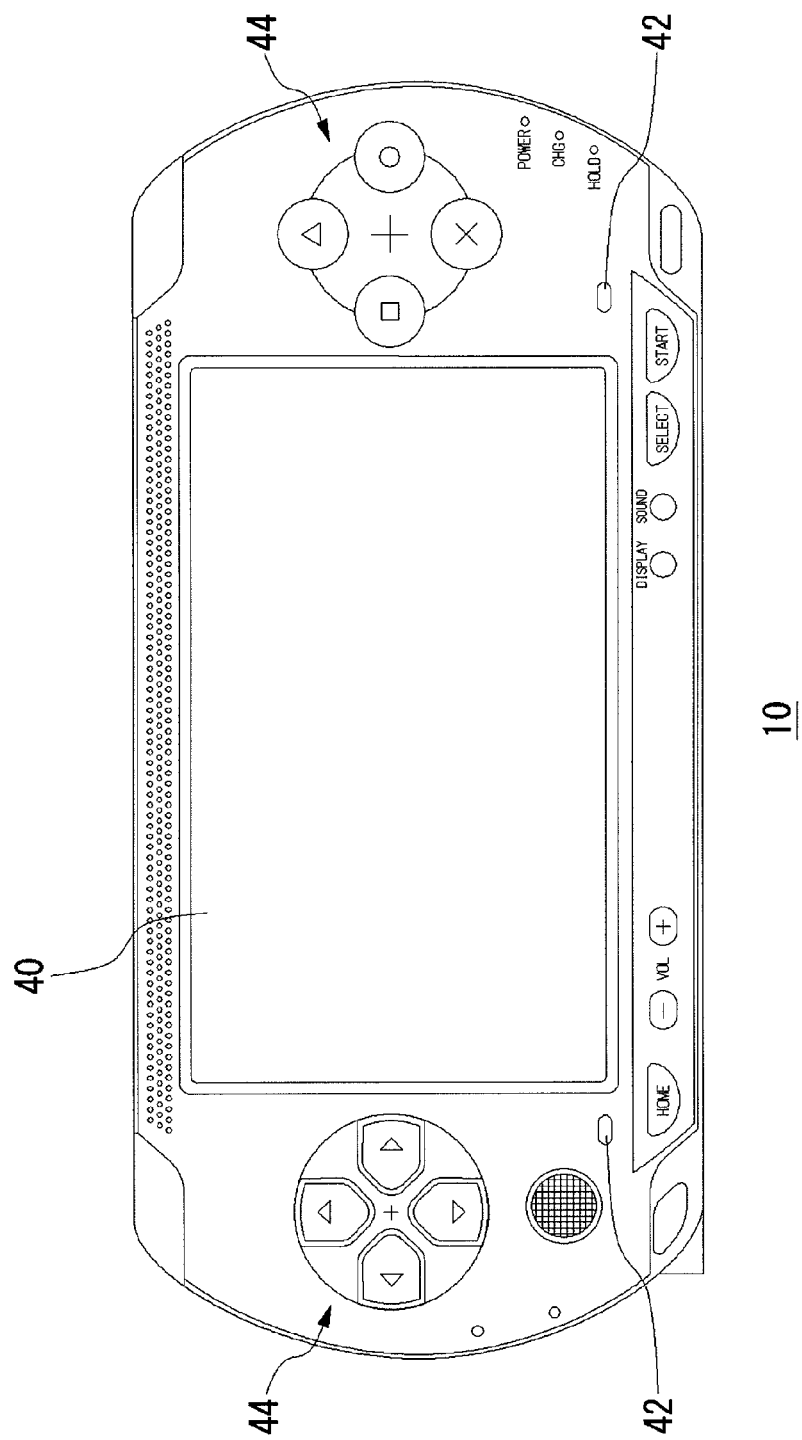
FIG. 2 is a diagram that shows an external configuration of an information terminal apparatus.

FIG. 2 shows an external configuration of the information terminal apparatus 10. The information terminal apparatus 10 comprises a display unit 40 for displaying a game image or a graphical user interface, an audio output unit 42 for outputting audio data, and an operation unit 44 for receiving an operation input from a user. The display unit 40 may be a liquid crystal display, and the audio output unit 42 may be a speaker. The operation unit 44 includes arrow keys and four kinds of buttons (○ button, x button, □ button, and Δ button) provided on the top of the casing, and buttons provided on a side of the casing.

Figure 3:
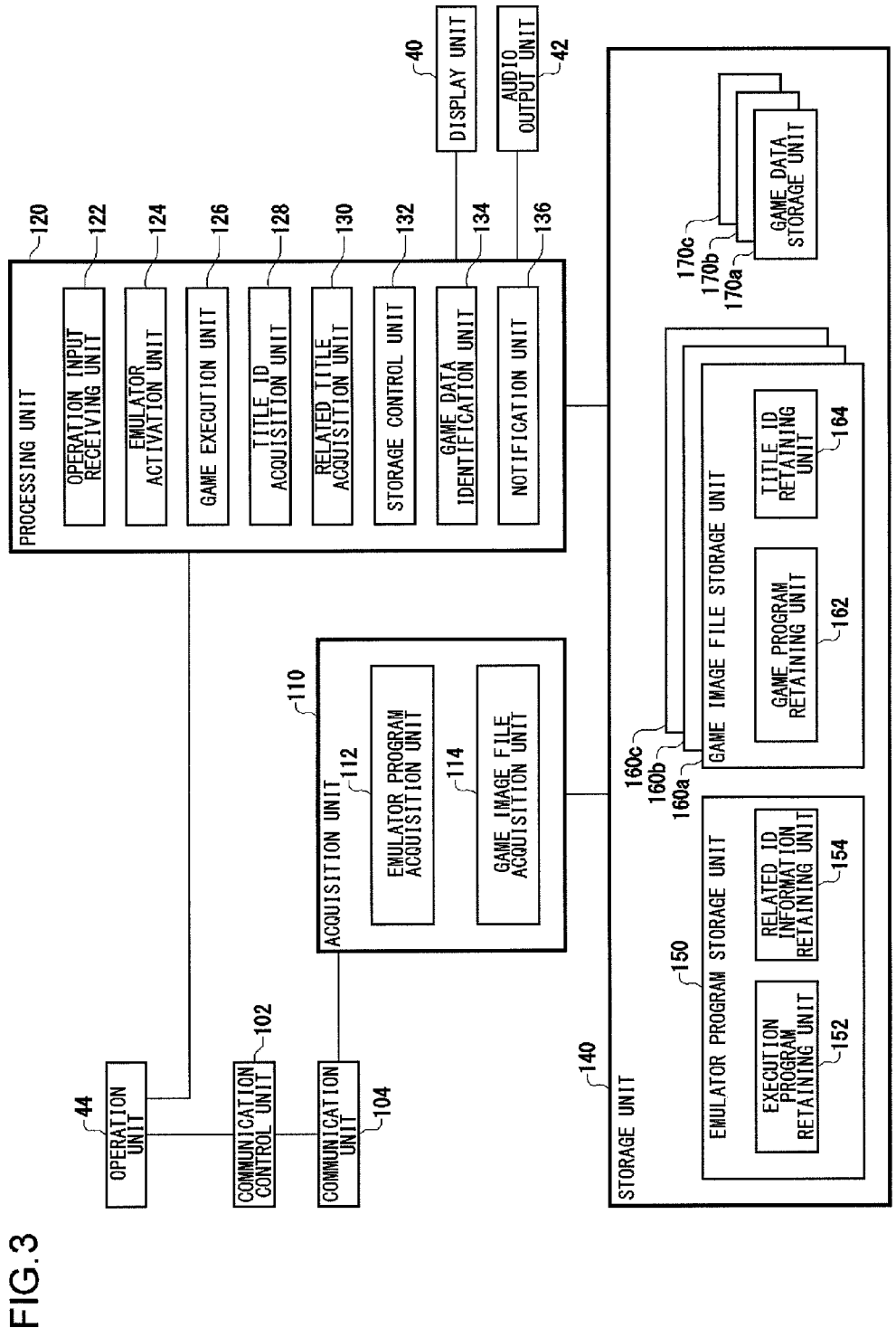
FIG. 3 is a diagram that shows a configuration of an information terminal apparatus for performing an emulation function.

FIG. 3 shows a configuration of the information terminal apparatus 10 for performing an emulation function. In addition to the display unit 40, audio output unit 42 and operation unit 44, the information terminal apparatus 10 further comprises a communication control unit 102, a communication unit 104, an acquisition unit 110, a processing unit 120 and a storage unit 140. The acquisition unit 110 is configured with an emulator program acquisition unit 112 and a game image file acquisition unit 114, and acquires downloaded data from the communication unit 104. The processing unit 120 is configured with an operation input receiving unit 122, an emulator activation unit 124, a game execution unit 126, a title ID acquisition unit 128, a related title acquisition unit 130, a storage control unit 132, a game data identification unit 134 and a notification unit 136, and performs an emulation function of the information terminal apparatus 10. The storage unit 140 is a storage medium such as a flash memory, and the unit is configured with an emulator program storage unit 150, game image file storage units 160a, 160b and 160c (hereinafter, they may be collectively referred to as "game image file storage units 160"), and game data storage units 170a, 170b and 170c (hereinafter, they may be collectively referred to as "game data storage units 170"). The emulator program storage unit 150, game image file storage units 160 and game data storage units 170 may be provided in the same storage unit 140, or may be provided in different storage units.

The emulation function of the information terminal apparatus 10 may be realized by a CPU, a memory, a memory-loaded program, etc., and here is shown a functional block configuration realized by cooperation thereof. Although the information terminal apparatus 10 of the present embodiment functions as an emulation apparatus by downloading an emulator program, the emulator program may be stored within the information terminal apparatus 10. Therefore, it would be understood by those skilled in the art that these function blocks can be realized in a variety of forms by hardware only, software only or the combination thereof.

Upon receiving a download request for an emulator program from the operation unit 44, the communication control unit 102 connects the communication unit 104 to the emulator program providing server 20. The communication unit 104 then downloads the latest emulator program from the emulator program providing server 20 and provides it to the emulator program acquisition unit 112.

An emulator program in the present embodiment includes an execution program for an emulator and related ID information. Related ID information may be information with which, from a game title ID, other game title IDs related to the game title can be identified. The emulator program acquisition unit 112 stores an execution program in an execution program retaining unit 152 and stores related ID information in a related ID information retaining unit 154 in the emulator program storage unit 150.

Related ID information may be configured as a database or a table that relates pieces of identification information of game titles related to each other. In the communication system 1, a game title is assigned information uniquely identified (a title ID). The aforementioned "ABC car race 1", "ABC car race 2" and "ABC car race 3" constitute an "ABC car race" series, and are assigned title IDs "ABC-1", "ABC-2" and "ABC-3", respectively.

FIG. 4A shows an example of a related ID information database. In the related ID information database, IDs of game titles constituting a game series are related to each other and stored therein. With regard to the "ABC car race" series, "ABC-1", "ABC-2" and "ABC-3" are related to each other and contained in a certain record in the related ID information database. The title IDs may be related with version information so that newer or older game software can be recognized.

FIG. 4B shows an example of a related ID information table. The related ID information table contains a title ID with an ID of another game title belonging to the same game series assigned thereto. For the "ABC car race" series, "ABC-2" and "ABC-1" are assigned to "ABC-3". The "ABC car race 3" is the latest in the three software products, and game date of "ABC car race 1" and "ABC car race 2" can be used therein. Accordingly, "ABC-2" and "ABC-1" are provided with respect to "ABC-3" in the table.

With respect to "ABC-1", on the other hand, no game title ID is assigned. Since "ABC car race 1" is the first game software in the "ABC car race" series, game data of newer game software in the series cannot be used therein. In many cases, since newer game software use more game parameters, there are few cases where game data of new game software can be used in former game software. Therefore, no game title ID is assigned to "ABC-1" in the example shown in FIG. 4B.

With respect to "ABC-2", however, not only "ABC-1" but also "ABC-3" is assigned. It is a case where the game software of "ABC car race 3" generates game data processable in "ABC car race 2", and, with such relation established between the game software products, "ABC-3" can be assigned to "ABC-2".

Also, priorities may be provided in the assigning of title IDs and used to recognize newer or older game software. In this example, a title ID assigned earlier, i.e. shown on the left in FIG. 4B, is for newer game software and provided with a higher priority.

The communication control unit 102 also connects the communication unit 104 to the game image file providing server 30 upon receiving, from the operation unit 44, a request for connection with the game image file providing server 30. When the game image file providing server 30 transmits a list of game titles that can be downloaded and a user selects, with the operation unit 44, a desired game title in the list displayed on the display unit 40, a download request for the game image file is generated. The communication unit 104 then downloads the game image file from the game image file providing server 30 and provides it to the game image file acquisition unit 114.

In the present embodiment, a game image file at least contains an execution program for game software, and it may further contain an ID of a game title. The game image file acquisition unit 114 stores an image file of an execution program for game software in a game program retaining unit 162 and stores a title ID in a title ID retaining unit 164 in a game image file storage unit 160. In the present specification, an image file stored in the game program retaining unit 162 may be simply referred to as a game program or an execution program.

The game image file acquisition unit 114 stores an acquired game image file in the storage unit 140, with respect to each game software, or each game title. Accordingly, the game image file storage units 160 will be created in the storage unit 140 as many as the number of game software products downloaded.

Further, in the storage unit 140, a game data storage unit 170 stores game data including saved data of a game. Besides saved data, which is generated as a user advances a game, the game data may include information on game characters included in a game program, etc. For example, when data of a memory card used in a former game device is replicated in the storage unit 140, a game data storage unit 170 may be created in the storage unit 140 as a virtual memory card. Also, when a game program is executed by means of the emulator function of the information terminal apparatus 10, another game data storage unit 170 may be created in the storage unit 140 as a virtual memory card. Thus, a game data storage unit 170 is configured to have the disk image of a virtual memory card so that game data can be read out when a game program is executed by emulation.

A game data storage unit 170 stores game data with a title ID related thereto, so that the processing unit 120 can search for the game data. For example, when a title ID is used for a name of a directory storing game data or a name of a game data file in a game data storage unit 170, the processing unit 120 can use the title ID as a search key to search for the game data of the game title easily.

As stated above, the storage unit 140 is provided with the emulator program storage unit 150, game image file storage units 160 and game data storage units 170. This enables an emulator function in the information terminal apparatus 10 of the present embodiment.

Figure 5:
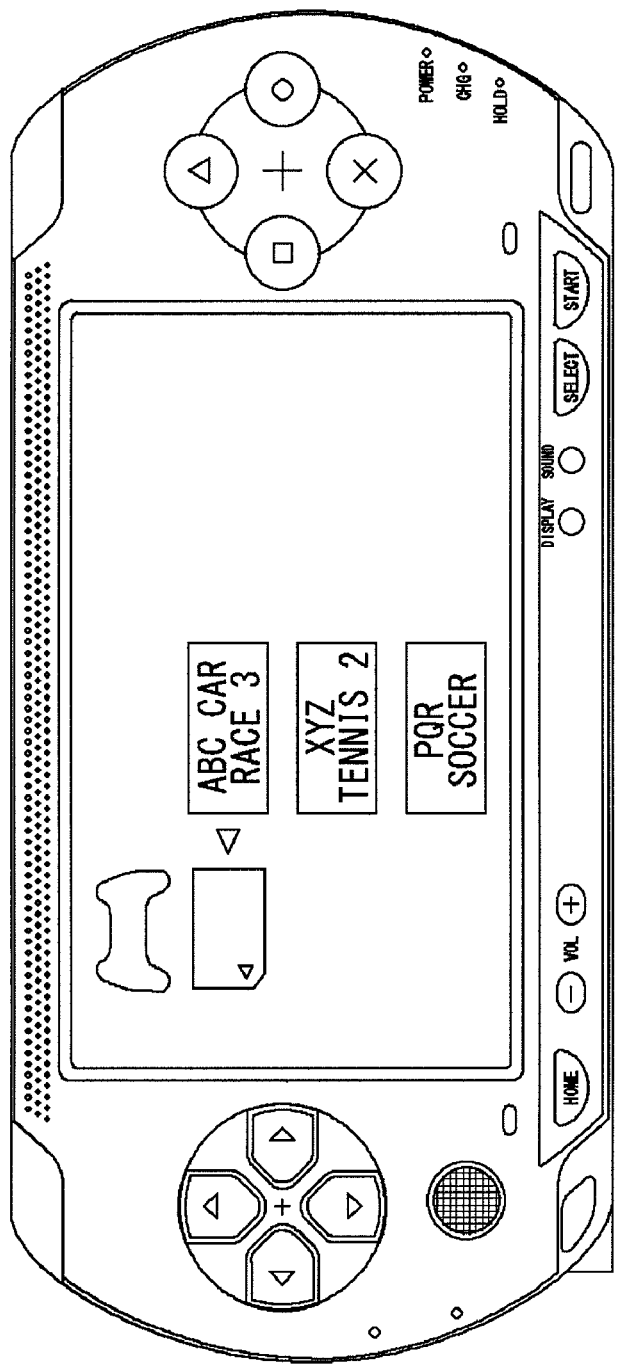
FIG. 5 is a diagram that shows a list of icons of game titles downloaded into and stored in a storage unit.

FIG. 5 shows a list of icons of game titles downloaded into and stored in the storage unit 140. Game title icons are displayed as many as the number of game image files stored in the game image file storage units 160. A user operates the operation unit 44 so that game title icons are scroll-displayed and selects an icon of a game title to be executed. It is assumed here that a user has selected "ABC car race 3".

Upon receiving a selection operation for a game title icon via the operation unit 44, the operation input receiving unit 122 in the processing unit 120 provides to the emulator activation unit 124 an instruction for executing the game program. The emulator activation unit 124 then reads an execution program for an emulator from the execution program retaining unit 152 and activates the program. Thus, the information terminal apparatus 10 operates as an emulation apparatus. When the emulation function is activated, the game execution unit 126 reads, in the resulting environment, the game program from the image file of "ABC car race 3" stored in the game program retaining unit 162. At this time, the game execution unit 126 determines if it is the first activation of the game program of "ABC car race 3". If it is the first activation, the storage control unit 132 defines within the storage unit 140 a storage area for storing game data of "ABC car race 3" and creates a game data storage unit 170. The storage control unit 132 may employ the title ID "ABC-3" of "ABC car race 3" for a directory name of the game data storage unit 170. Also, when storing game data in the game data storage unit 170, the storage control unit 132 may name the file so as to include the title ID "ABC-3".

In the present embodiment, a game data storage unit 170 is provided with respect to each game title, and the game execution unit 126 can only access, in a plurality of game data storage units 170, a game data storage unit 170 assigned to a game title of which game program is to be executed. In the following, the description will be made assuming that the game data storage units 170 are configured to have directory names identical with title IDs, and that each of the units can store a predetermined number (15, for example) of game data files. A game data storage unit 170 is a disk image of a memory card, and it is configured to have a storage area of about 1 megabyte.

When a game program is executed for the second and subsequent times, the storage control unit 132 saves game data in the game data storage unit 170 created in the first activation, and reads saved data from the game data storage unit 170. Once a predetermined number of game data files are written to the game data storage unit 170, game data is stored from then on by overwriting saved data already recorded therein.

The game execution unit 126 may search the storage unit 140 for a directory identified by the title ID of the game program, so as to determine if the game program is activated for the first time. Specifically, if there is no directory having a name identical with the title ID, it may be determined that the game program is activated for the first time. If there is such directory, it may be determined that it is not the first activation. For this determination process, various methods may be considered other than the method above. For example, a "first-activation-completed flag", of which default value is set to OFF, may be embedded in a game program. If the game execution unit 126 sets the first-activation-completed flag ON in the first activation of the game program and overwrites the program accordingly, the first activation determination process can be facilitated in the second or subsequent activation.

The title ID acquisition unit 128 acquires from the title ID retaining unit 164 a title ID of a game program to be executed. Although it is assumed in the present embodiment that a title ID is embedded in a game image file to be downloaded, the title ID may be uniquely obtained by, for example, computing a hash value from the image file. In such case, there is no need to embed a title ID in a game image file, and hence, game image files can be created easily. A title ID may be any ID that can uniquely identify a game title. For example, a product number of game software may be used as a game title ID.

The related title acquisition unit 130 refers to the related ID information database (see FIG. 4A) stored in the related ID information retaining unit 154, so as to search for and acquire another game title ID that is related to the title ID acquired by the title ID acquisition unit 128. If the title ID acquired by the title ID acquisition unit 128 is "ABC-3", for example, the related title acquisition unit 130 will refer to the related ID information database to learn that "ABC-3" and game titles "ABC-1" and "ABC-2" constitute a game series, and will acquire those IDs. Also, the related title acquisition unit 130 may refer to the related ID information table stored in the related ID information retaining unit 154 to search for and acquire another game title ID.

The game data identification unit 134 searches for and identifies game data stored in the game data storage units 170, based on the title ID acquired by the related title acquisition unit 130 ("ABC-1" and "ABC-2" in this example). Since game data in the storage unit 140 is stored in directories identified by title IDs, the game data identification unit 134 can identify game data of a related game title by searching for a directory name identical with the title ID of the game title.

Figure 6:
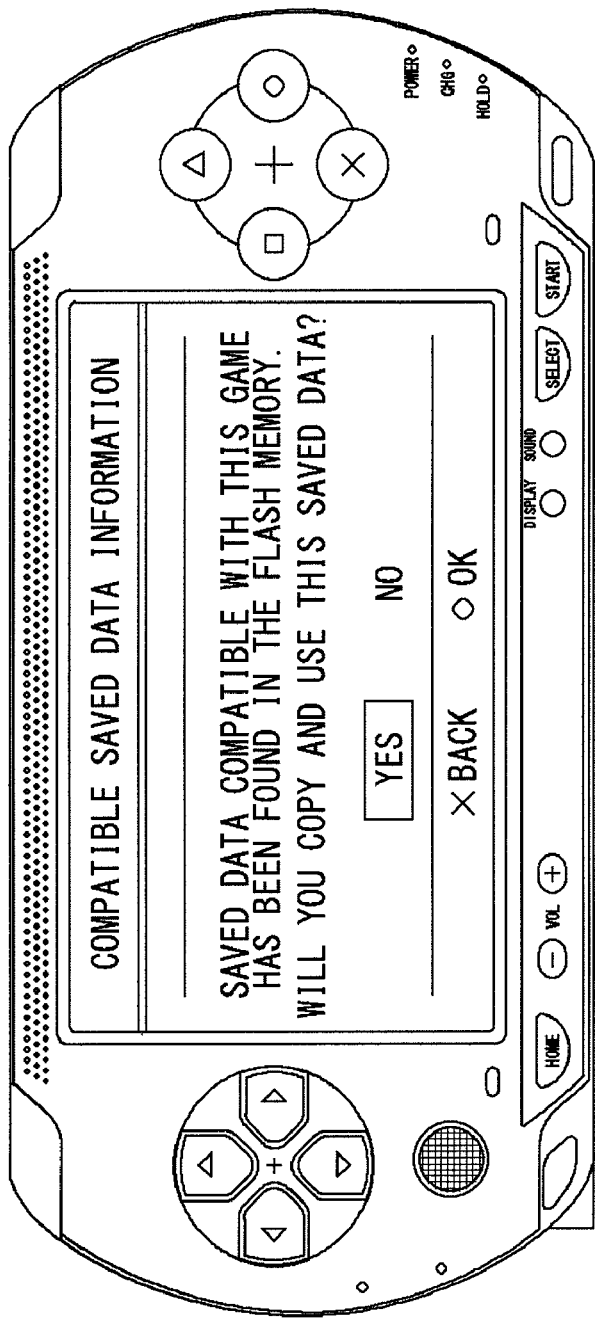
FIG. 6 is a diagram that shows a message screen displayed when game data of a game title related to a game title to be executed is detected in the storage unit.
Figure 7:
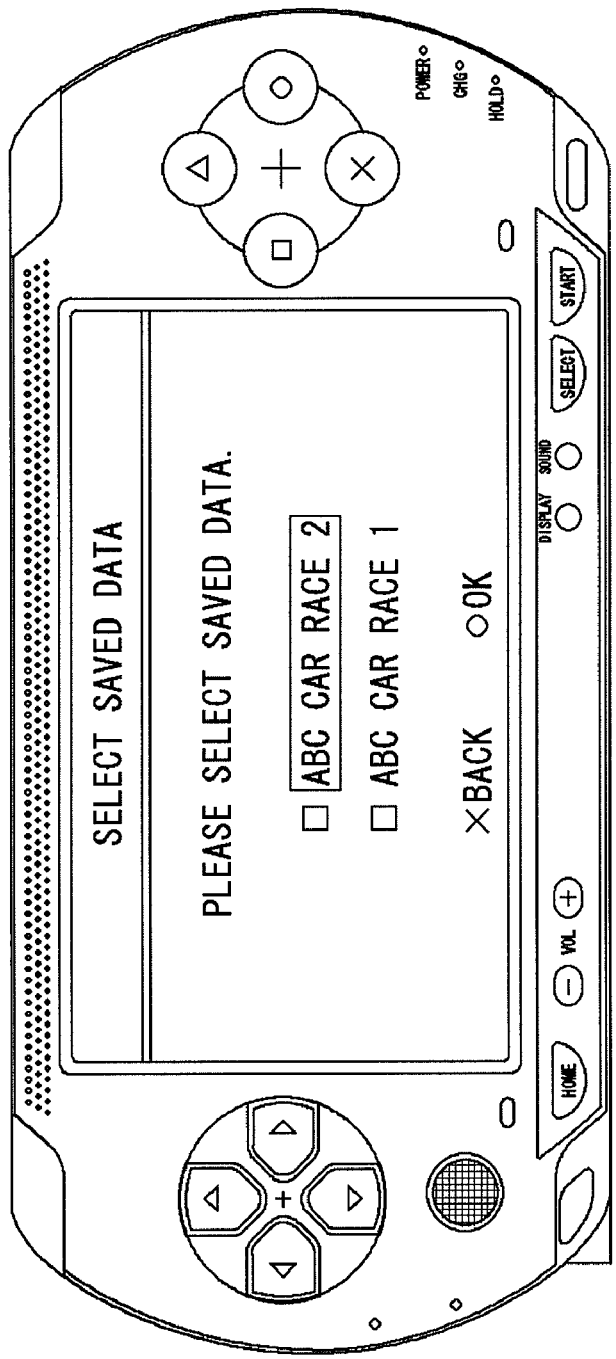
FIG. 7 is a diagram that shows a list screen displayed when game data of multiple related game titles are detected.
Figure 8:
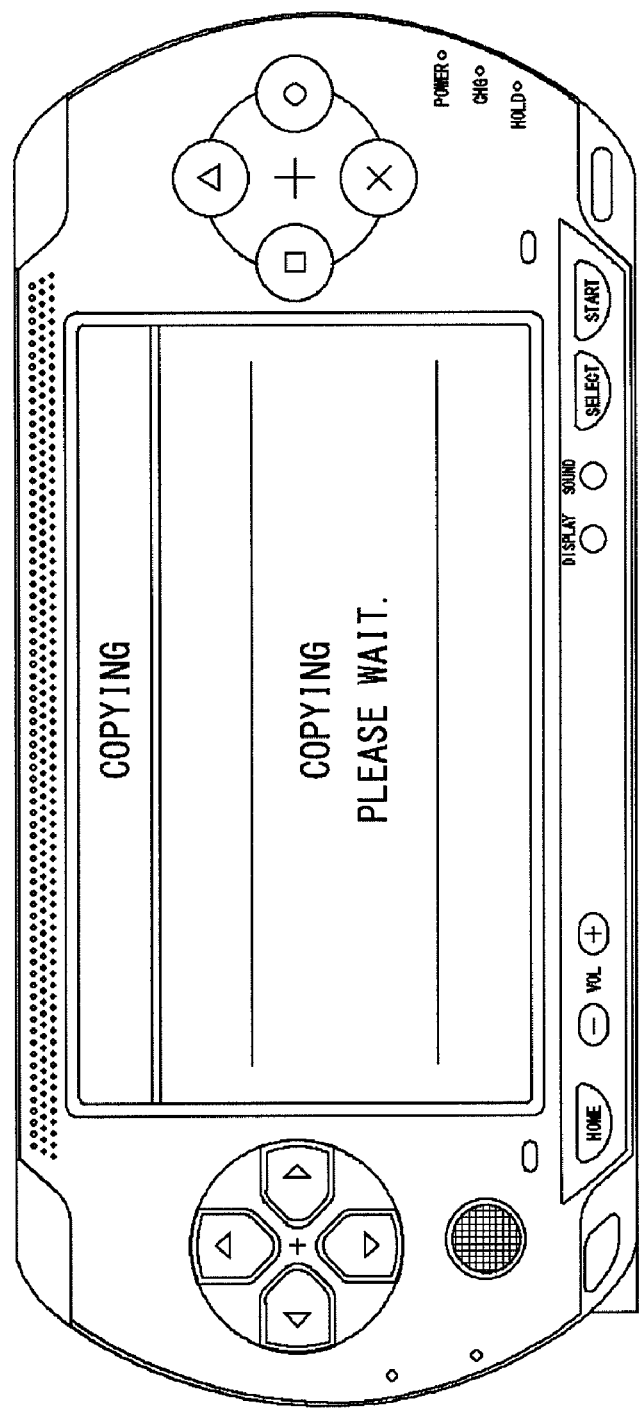
FIG. 8 is a diagram that shows a notification screen provided by a notification unit.

When game data is identified by the game data identification unit 134, the notification unit 136 notifies a user of information on the identified game data, via the display unit 40 or the audio output unit 42. FIGS. 6-8 show notification screens provided by the notification unit 136.

FIG. 6 shows a message screen displayed when game data of a game title related to a game title to be executed is detected in the storage unit 140. When a user wishes to use saved data of another version of game software, the user selects "YES" and presses "OK". With such notification, users are provided with opportunities to consider the replication of game data.

FIG. 7 shows a list screen displayed when game data of multiple related game titles are detected. A user selects saved data to be used and presses "OK". In FIG. 7, saved data of "ABC car race 2" is selected.

FIG. 8 shows a message screen displayed while game data is replicated in a game data storage unit 170. When the operation input receiving unit 122 receives an operation for selecting saved data via the operation unit 44, the storage control unit 132 writes the game data of the selected "ABC car race 2" into a game data storage unit 170 that is newly created for "ABC car race 3". Thus, the saved data of "ABC car race 2" can be replicated in the game data storage unit 170 for "ABC car race 3". Accordingly, when executing the game program of "ABC car race 3", the game execution unit 126 can access the game data of "ABC car race 2".

With regard to the list screen shown in FIG. 7, names of virtual memory cards, i.e. game data directories, or, alternatively, names of game data files may be listed and displayed thereon. If names of detected game data files are listed and displayed, they should be preferably displayed along with the dates and times when the files are created so that users can recognize newer data easily. Accordingly, users can readily distinguish the latest saved data. Similarly, when directory names are listed and displayed, they should be preferably displayed along with the dates and times when the directories are updated. Also, it may be provided that only the name of the latest game data file is displayed, or that only the name of the latest game data file with respect to each game title is displayed.

The related ID information database shown in FIG. 4A or the related ID information table shown in FIG. 4B allows the related title acquisition unit 130 to distinguish a newer or older related game title, so that the latest game title can be selected from among related game titles. Accordingly, the related title acquisition unit 130 may acquire only the latest title ID in related game titles, and the game data identification unit 134 may subsequently identify game data based on the title ID. Since saved data of a newer version of game software is typically considered to be newer, it is desirable to select a single related game title in such way, as it reduces the amount of data displayed on the display unit 40.

The embodiment above describes a case where the replication of game data is performed in the first activation of a game program. The replication of game data may be performed while a game program runs, according to the user's request for acquiring game data. In the example above, there may be a case where, after game data of "ABC car race 2" is replicated in the first activation of the game program, game data of "ABC car race 1" is required during game play. If the game data storage unit 170 already contains game data, the game data of "ABC car race 1" will be stored in free space in the game data storage unit 170. A user can replicate game data via the operation unit 44 even while the user does not play a game. For example, when a list of virtual memory cards are displayed on the display unit 40, a user can replicate game data of a virtual memory card in another virtual memory card by operating the operation unit 44.

Figure 9:
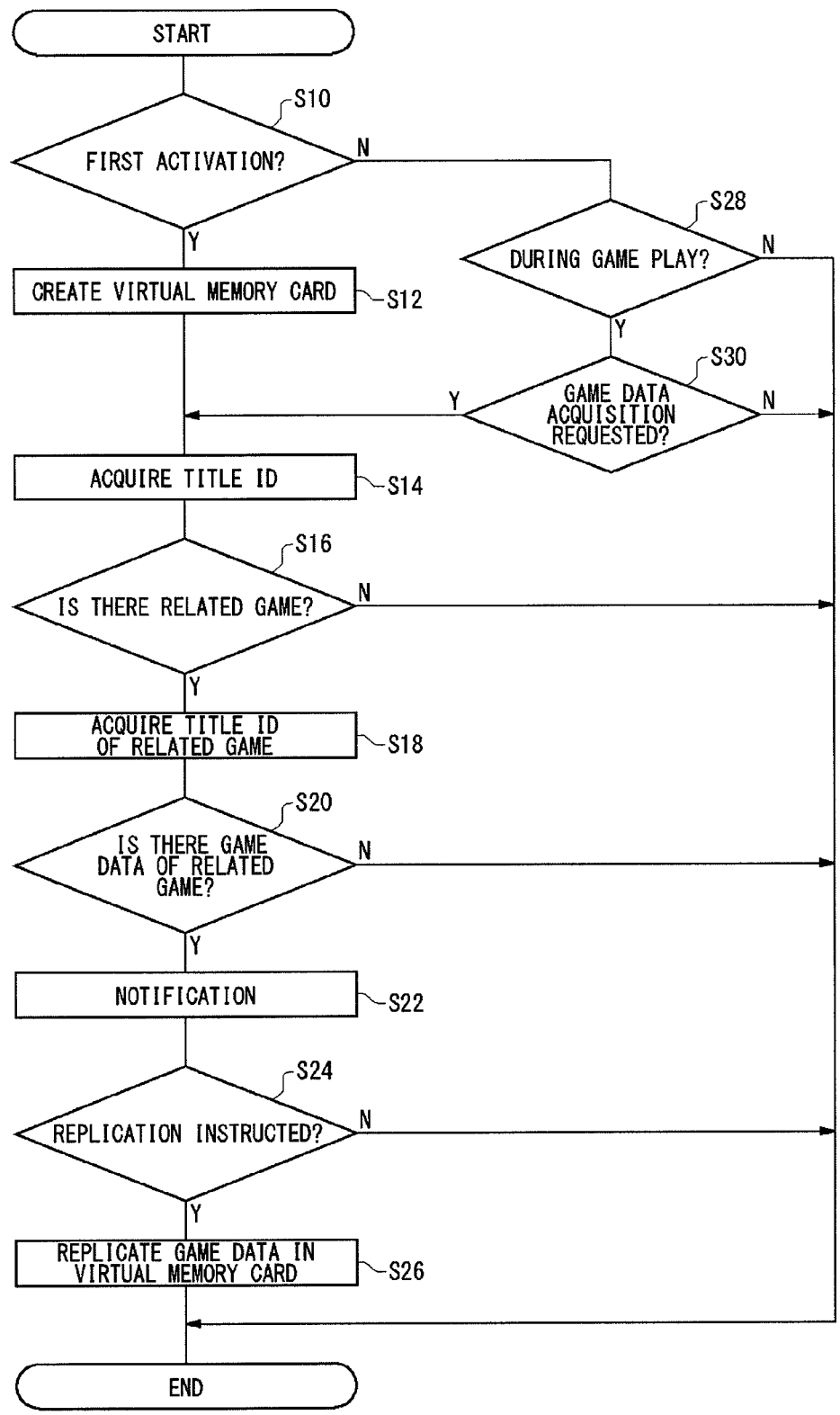
FIG. 9 is a flow diagram of game data replication processing performed by the information terminal apparatus.

FIG. 9 shows a flowchart of game data replication processing performed by the information terminal apparatus 10. First, the game execution unit 126 determines if the game program is activated for the first time (S10). If it is the first activation (Y at S10), the storage control unit 132 creates, as a virtual memory card, a game data storage unit 170 with a directory name identical with the title ID of the game program to be executed, in the storage unit 140 (S12). At the time, the storage area of the game data storage unit 170 is empty. Next, the title ID acquisition unit 128 acquires the title ID of the game program (S14). The related title acquisition unit 130 then refers to the related ID information database or table to search for a title ID of another game program related to the acquired title ID (S16). If there is no related game software (N at S16), the process will terminate there.

If there is related game software (Y at S16), the related title acquisition unit 130 will acquire the title ID of the game program (S18). The game data identification unit 134 then searches the storage unit 140 for a directory named with the title ID of the related game program (S20). If there is no directory name corresponding to the title ID (N at S20), the process will terminate there. If there is a directory name corresponding to the title ID and if the directory contains game data of the related game program (Y at S20), the notification unit 136 will notify the user thereof (S22). If the user inputs a replication instruction via the operation unit 44 upon receiving the notification (Y at S24), the storage control unit 132 will replicate the game data of the related game program in the empty virtual memory card that has been created (S26). Thus, data saved in another game program can be replicated in a virtual memory card, without troubling the user. If there is no replication instruction from the user (N at S24), the storage control unit 132 will not replicate the game data.

If it is not the first activation in S10 (N at S10) and if it is during game play (Y at S28), the game execution unit 126 will check for a user's request for acquiring game data (S30). If there is a user's request for acquiring game data (Y at S30), S14 and subsequent steps will be performed to replicate game data. Since S14 and subsequent steps are already performed in the first activation of the game program, the process may skip to S22 if it is determined that the storage unit 140 contains game data of a related game program (Y at S20). Thus, game data can be replicated even during game play. If it is not during game play (N at S28), or if there is no request for acquiring game data (N at S30), the process will terminate there.

If it is not during game play (N at S28) and if there is a user's request for replicating game data, S14 and subsequent steps may be performed when, for example, the user specifies the game title.

The present invention has been described with reference to an embodiment. The embodiment is intended to be illustrative only and it will be obvious to those skilled in the art that various modifications to constituting elements or processes could be developed and that such modifications are also within the scope of the present invention. For example, although in the embodiment above a list screen is provided to a user via the GUI (Graphical User Interface) shown in FIG. 7 to facilitate game data replication processing, the notification to a user may be provided in another way. For example, a user may be merely notified that there is game data of a related game title in the storage unit 140. Upon reception of the notification, the user can perform a file replication operation while being aware of the existence of game data of a related game title. When compared to a case where a file replication operation is intended while it is not clear whether there is game data of a related game title in the storage unit 140, such notification can provide an incentive to a user to search the storage directory for the game data.

Although game data is stored in the single storage unit 140 in the embodiment above, game data may be stored in, for example, multiple storage media. Also, a storage medium storing game data may be provided in a game device or the like that connects to the network 14, or may be provided in a game device or the like that directly connects to the information terminal apparatus 10 by wireless or wired means. The game data identification unit 134 searches for a device that may possibly store game data of a related game program, and then identifies the game data. When displaying a list of identified game data on the display unit 40 (see FIG. 7), the notification unit 136 may also display information for identifying a device that stores the game data.

Although the embodiment above has described that the related ID information is included in an emulator program in the form of a database or a table, the information may be embedded in an image file transmitted from the game image file providing server 30. Specifically, an ID of a related game title may be embedded in an image file, so that the related title acquisition unit 130 can acquire the embedded ID from the image file when the game is executed. Accordingly, the storage unit 140 needs not retain such database or table, thereby reducing the amount of data to be stored. The related title acquisition unit 130 may also inquire of the emulator program providing server 20 or game image file providing server 30 as to a game title ID related to the title ID acquired by the title ID acquisition unit 128 and acquire the game title ID, when the game is executed.

Also, the embodiment above has described a case where the information processor is an emulation apparatus that executes a game program for a certain game device. It should be appreciated that the present invention is applicable not only to an information processor for executing a game program, but also to an information processor for processing content data including another application program, etc. Specifically, although the embodiment above employs game software as an example of the content, it may be document creating application software or image data.

An information processor of another embodiment comprises: a related identification information retaining unit which relates and stores pieces of identification information of contents related to each other; a content data storage unit which stores content data; a process data identification information acquisition unit which acquires identification information of content data to be processed; a related data acquisition unit which acquires, from the related identification information retaining unit, identification information of other content data related to identification information acquired by the process data identification information acquisition unit; and an identification unit which identifies other content data related, based on identification information acquired by the related data acquisition unit. The configuration above will now be described in contrast with the configuration shown in FIG. 3. The related identification information retaining unit corresponds to the related ID information retaining unit 154. The content data storage unit corresponds to a configuration comprising the emulator program storage unit 150 and the game image file storage unit 160. The process data identification information acquisition unit corresponds to the title ID acquisition unit 128. The related data acquisition unit corresponds to the related title acquisition unit 130. The identification unit corresponds to the game data identification unit 134.

The information processor of this embodiment can be used when, for example, application data created with document creating software A is processed with document creating software B. In such case, a user may find out desired application data and have the application data loaded using the document creating software B. However, when there are many pieces of application data created with the document creating software A, it may be troublesome for the user to find the desired data from among them.

For such occasion, the related identification information retaining unit relates and stores identification information of the document creating software A and identification information of the document creating software B. Also, the content data storage unit stores application data created with the document creating software A and the program of the document creating software B. When the execution means of the information terminal apparatus executes the program of the document creating software B, the process data identification information acquisition unit acquires the identification information of the document creating software B. The related data acquisition unit then acquires, according to the identification information of the document creating software B, the identification information of the document creating software A related thereto. Accordingly, the identification unit can identify the application data created with the document creating software A in the content data storage unit. Further, notification means may provide information on the identified application data. Thus, by relating and storing pieces of identification information of contents (application software) related to each other, data of a content different from the content to be executed can be identified easily.

Also, the information processor can be used for an application, with which moving image data is displayed after another image data related thereto is displayed. For example, the another image data related may be data of a preview movie for the moving image data. When having the moving image data displayed, a user may find out the image data of the preview movie in the storage medium. However, when there are many pieces of image data, it may be troublesome to find the intended data in the storage medium.

For such occasion, the related identification information retaining unit relates and stores identification information of the moving image data and identification information of the related preview movie image. Also, the content data storage unit stores the moving image data and the image data of the preview movie. When the execution means of the information terminal apparatus 10 initiates image processing (reproduction process, for example) of the moving image data, the process data identification information acquisition unit acquires the identification information of the moving image data. The related data acquisition unit then acquires, according to the identification information of the moving image data, the identification information of the review movie image data related thereto. Accordingly, the identification unit can identify the preview movie image data in the content data storage unit. Further, notification means may provide information on the preview movie image data. Thus, by relating and storing pieces of identification information of contents (image data) related to each other, data of a content different from the content to be executed can be identified easily. Although the contents for these information processors have been considered to be of the same kind, it is possible to relate contents of different kinds.

What is claimed is:

1. An information processor comprising:
a related identification information retaining unit, which stores identification information of a title series of one or more games, relating the identification information of a game to the identification information of another game that was previously released in the title series;
a program storage unit, which stores an application program;
a data storage unit, which stores, in a memory, user save data of a previously-activated application program, by using identification information of the previously-activated application program as a directory name or a file name for the user save data;
an operation input receiving unit for receiving an operation input from a user to select an application program to be executed;
an execution unit for reading the selected application program from the program storage unit and executing the read application program, and for monitoring a request from the user to acquire user save data while the application program is being executed;
a title identification information acquisition unit, which acquires identification information of the game whose application program is being executed by the execution unit;
a related title acquisition unit, which acquires, from the related identification information retaining unit, the identification information of another application program of the title series to which the game of the executed application program belongs, upon the request from the user to acquire previously-stored user save data while the application program is being executed;
an identification unit, which identifies the previously-stored user save data stored in the data storage unit based on the identification information acquired by the related title acquisition unit;
a notification unit, which, when the identification unit identifies the previously-stored user save data as being of the title series to which the executed application program belongs, notifies the user of information on the identified user save data, via a display unit or an audio output unit; and a storage control unit, which, when the operation input receiving unit receives the operation input from the user to select the user save data after the notification unit notifies the user of the information, replicates the selected user save data in the data storage unit by using the identification information of the application title of the application program that is being executed for the directory name or the file name.

2. The information processor of claim 1, wherein the related identification information retaining unit relates and stores pieces of identification information of a plurality of games that constitute a title series.

3. The information processor of claim 1, wherein the storage control unit defines, in an initial activation of the application program, a storage area for storing the user save data of the application program so as to create the data storage unit, using the identification information of the application program initially activated for the directory name or the file name, and replicates the user save data identified by the identification unit in the data storage unit thus created.

4. The information processor according to claim 1, wherein the application program is a game program.

5. A non-transitory computer-readable medium having an emulator program stored therein, which when executed, causes an information processor to perform:

storing identification information of a title series of one or more games;

relating the identification information of a game to the identification information of another game that was previously released in the title series;

storing, in a memory, user save data of a previously-activated application program, by using identification information of the previously-activated application program as a directory name or a file name for the user save data;

receiving an operation input from a user to select an application program to be executed;

retrieving the selected application program and executing the application program;

monitoring a request from the user to acquire user save data while the application program is being executed;

acquiring identification information of the game whose application program is being executed;

acquiring the identification information of another application program of the title series to which the game of the executed application program belongs upon the request from the user to acquire previously-stored user save data while the application program is being executed;

identifying the previously-stored user save data stored in the memory based on the acquired identification information of the other application title;

notifying the user of information on the identified user save data, via a display unit or an audio output unit, when the previously-stored user save data is identified as being of the title series to which the executed application program belongs; and replicating, when receiving the operation input from the user to select the user save data after the user is notified of the information, the selected user save data in the memory by using the identification information of the application title of the application program that is being executed for the directory name or the file name.

6. A recording medium storing the emulator program of claim 5 provided for a game device.

\* \* \* \* \*